United States Patent
Emery et al.

(10) Patent No.: US 7,112,750 B2
(45) Date of Patent: Sep. 26, 2006

(54) WEIGHING MODULE WITH A DUST REMOVING DEVICE

(75) Inventors: Jean-Christophe Emery, Schwerzenbach (CH); Willi Graf, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 47 days.

(21) Appl. No.: 11/128,540

(22) Filed: May 13, 2005

(65) Prior Publication Data

US 2005/0217902 A1    Oct. 6, 2005

Related U.S. Application Data

(63) Continuation of application No. PCT/EP03/50804, filed on Nov. 7, 2003.

(30) Foreign Application Priority Data

Nov. 15, 2002   (DE) ................ 102 53 601

(51) Int. Cl.
*G01G 21/28* (2006.01)

(52) U.S. Cl. ........................ 177/180; 177/238

(58) Field of Classification Search ........ 177/180–181, 177/238–244
See application file for complete search history.

(56) References Cited

U.S. PATENT DOCUMENTS

| | | | |
|---|---|---|---|
| 5,402,672 A * | 4/1995 | Bradford | 73/76 |
| 5,617,648 A * | 4/1997 | Leisinger et al. | 34/226 |
| 6,515,238 B1 * | 2/2003 | Martens et al. | 177/180 |
| 6,600,112 B1 | 7/2003 | Iseli | 177/154 |
| 6,945,130 B1 * | 9/2005 | Burkhard | 73/865.6 |
| 2001/0039831 A1 * | 11/2001 | Olesen | |
| 2002/0092468 A1 * | 7/2002 | Mauchle et al. | |
| 2003/0115976 A1 | 6/2003 | Burkhard | |
| 2004/0103718 A1 * | 6/2004 | Olesen | |

FOREIGN PATENT DOCUMENTS

| | | | | |
|---|---|---|---|---|
| DE | CH 633106 A * | 9/1978 | | 177/180 |
| DE | 3205799 | 8/1983 | | |
| DE | G 85 08 424.7 | 4/1986 | | |
| DE | G 88 05 063.7 | 8/1989 | | |
| FR | 00998837 | 1/1952 | | |

\* cited by examiner

*Primary Examiner*—Randy W. Gibson
(74) *Attorney, Agent, or Firm*—Standley Law Group LLP

(57) ABSTRACT

A weighing module with a housing surrounding a weighing cell on all sides has a vertically movable force transfer member designed to be connected to a load-receiving device. The force transfer member extends through a passage opening of a housing wall and is rigidly connected to a vertically movable part of the weighing cell. The weighing module includes a dust-removing device which further includes a means for generating a gas flow directed away from the movable part of the scale for the purpose of preventing an accumulation of dust between the stationary housing and the vertically movable force transfer member.

20 Claims, 3 Drawing Sheets

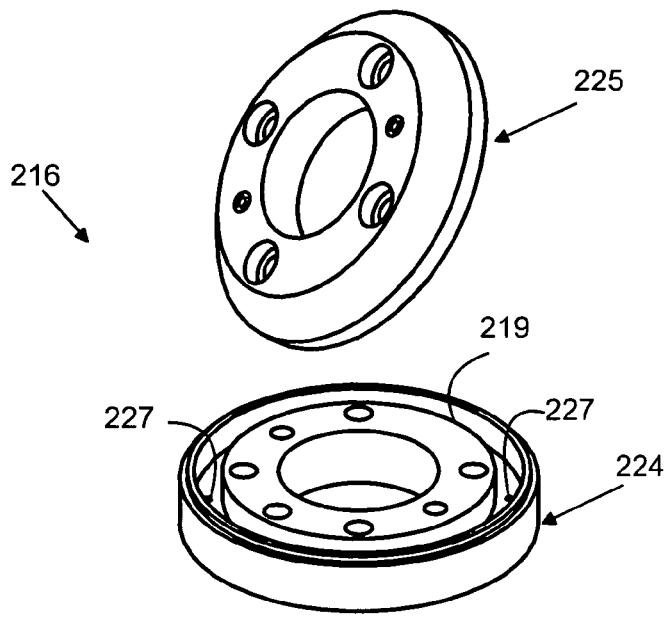
FIG. 3
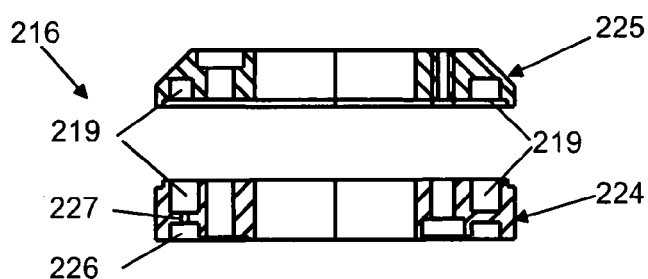
FIG. 4
FIG. 5

WEIGHING MODULE WITH A DUST REMOVING DEVICE

This application is a continuation of International Application No. PCT/EP03/50804, filed Nov. 7, 2003.

BACKGROUND

The invention relates to a weighing scale, in particular a weighing module with a housing that encloses a weighing cell on all sides, with a force transfer member designed to be connected to a load-receiving device, wherein the force transfer member passes through an opening in a wall of the housing and is rigidly connected to a vertically movable part of the weighing cell.

Weighing scales or weighing modules of this kind are used primarily in an industrial environment, for example in the form of so-called belt conveyor scales in which the weighing module is arranged for example under a belt conveyor, to weigh objects that are transported on the conveyor belt. However, the environment in which a weighing module of this kind is installed is often very dusty. This means that the weighing module needs to be enclosed by a protective housing and that it needs to be protected against the penetration of dust in particular in the areas where the housing has openings to the outside. Particularly critical in this regard is the opening that serves as passage for the force transfer member through the housing wall. Obviously, this opening is unavoidable in order to allow a load-receiving device to be connected to the vertically movable part of the weighing cell. The state of the art offers a variety of measures that are proposed as a means of avoiding the penetration of dirt into the interior of a weighing module housing, also referred to interchangeably as a "scale housing."

For example, commonly-owned U.S. Pat. No. 6,600,112 discloses a weighing scale with an arresting mechanism that performs a sealing function. The arresting mechanism consists of an elastic device that can be made to expand and contract so that it provides a tight-fitting contact between a stationary part that is connected to the scale housing and a part which, under a load, is movable relative to the scale housing. This device releases the movable part of the scale during the weighing process while holding it immobilized during the rest of the time. The arresting mechanism has at the same time a certain sealing effect which is particularly effective if the elastic device is arranged between the force transfer member and the scale housing. This arrangement prevents the penetration of dust into the interior of the scale housing to a large extent. A further measure which is disclosed in the same reference consists of providing the force transfer member with a cup-shaped cap which may be part of a labyrinth baffle.

These measures may provide adequate protection against the penetration of dust even in an exceptionally dusty environment, but they create the problem that there is only a relatively small gap between the stationary housing of the weighing module and the vertically movable force transfer member with the attached cap, which entails the risk that a dust bridge will form, as a mechanical connection so-to-speak, between the two parts. The dust can be airborne dust or material to be weighed that has fallen down from the load-receiving device. In weighing modules that are equipped with a sensitive, high-resolution weighing cell, this kind of a dust bridge can be enough to establish a mechanical short circuit and thereby introduce errors in the weighing result.

Therefore, the task set for the invention is to improve a scale, and in particular a weighing module, in the sense that the formation of a "dust bridge" between the stationary housing and the movable part of the scale is avoided.

SUMMARY OF THE INVENTION

According to the invention, the foregoing task is solved through an arrangement according to the features of claim 1. A scale, in particular a weighing module with a housing surrounding the weighing cell on all sides, has a vertically movable force transfer member designed to be connected to a load-receiving device, wherein the force transfer member extends through a passage opening of a housing wall and is rigidly connected to a vertically movable part of the weighing cell. The weighing module is equipped with a dust-removing device which has a gas supply and a means to generate a gas flow directed away from the movable part of the scale for the purpose of preventing an accumulation of dust between the stationary housing and the vertically movable force transfer member.

This has the advantage that no dust bridges can form between the stationary part and the movable part of the scale, in particular between the force transfer member and the scale housing, and that the influence that dust and other contamination has on the weighing result and on its displayed value is minimized.

In a preferred embodiment, the dust-removing device has a gas distributor designed as a single part or with a plurality, particularly two, components and which comprises a distributor ring and a cover designed to be connected to the distributor ring.

In a special configuration according to the invention, the gas distributor has at least one ring-shaped flow channel for a gas under above-atmospheric pressure, in particular compressed air. In an alternative arrangement, the gas distributor comprises two flow channels that are connected to each other, wherein a first flow channel is connected to a gas inlet, and a second flow channel has a gas outlet.

In specific designs, the gas outlet consists of jet nozzles directed away from the movable part of the scale, or as an alternative, the gas outlet is configured as a narrow gap that surrounds the dust-removing device.

The gas distributor can be arranged substantially within the scale housing or it can be set on the scale housing from the outside.

The invention offers a way to realize a method for the prevention of a dust accumulation between the stationary housing and the vertically movable force transfer member in a scale, and more specifically in a weighing module, wherein a gas stream that is present during the weighing process as well as outside the weighing process is directed away from the movable part of the scale. As a preferred concept, the gas stream is continuous, or alternatively in the form of pulse-shaped emissions of gas.

BRIEF DESCRIPTION OF THE DRAWINGS

The invention will hereinafter be explained in detail based on drawings that are schematically simplified, wherein:

FIG. 3 represents a perspective view of a gas distributor consisting of two parts in a further embodiment of the invention;

FIG. 4 represents a sectional view of the gas distributor of FIG. 3; and

FIG. 5 represents a top view of the gas distributor of FIG. 3.

DETAILED DESCRIPTION OF THE INVENTION

Figure 1:
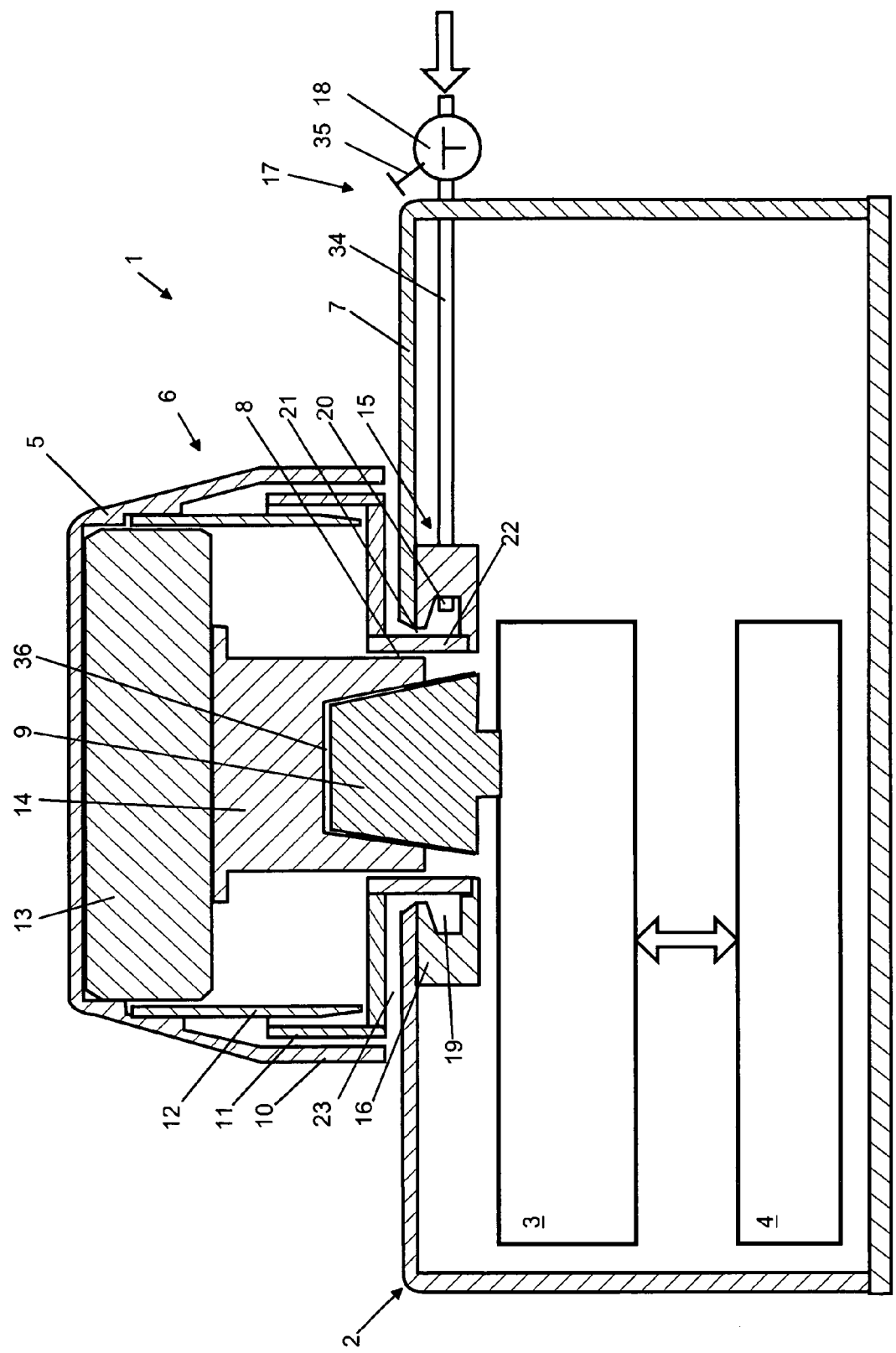
FIG. 1 represents a lengthwise sectional view of a weighing module with a device according to the invention for removing the dust by means of a gas.

FIG. 1 gives a schematic representation of a weighing module 1, for example a belt conveyor scale designed to be arranged under a weighing section of a conveyor belt, with a tightly closed and easy-to-clean housing 2. A weighing cell 3, which is known per se and which is connected to an electronics module 4, is arranged inside the scale housing. A force transfer member 6 with a cup-shaped cap 5 extends above the scale housing 2, passing with vertical mobility through an opening 8 of the top wall 7 of the scale housing 2 and transmitting a force generated by the weighing object onto a frusto-conical force receiver 9 that is connected to the weighing cell 3. Accordingly, the force transfer member 6 represents an essential component of the movable part of the scale.

The cup-shaped cap 5 rests on a support 13 which is connected to a hub part 14 seated on the frusto-conical force receiver 9. The hub part 14 has a seating recess 36 of a matching frusto-conical shape.

The cap 5 has a skirt-shaped outer ring 10 and a tubular inner ring 12. The rings 10 and 12, which have different diameters, are arranged coaxially and they laterally delimit a hollow space between them. An intermediate ring 11 is arranged on the housing 2 between the outer ring 10 and the inner ring 12, concentrically surrounding the opening 8 of the housing 2 and cooperating with the concentric rings 10 and 12 to form a labyrinth baffle seal against the penetration of dust into the scale housing 2.

The cap 5 can be removed for the purpose of cleaning. This is particularly necessary in a dusty environment. However, as described above, a large quantity of dust can settle on the scale housing 2 even while the weighing system is in operation, so that the dust may mechanically bridge the gap between the stationary scale housing 2 and the vertically movable force transfer member 6, in particular the cap 5. The scale 1 is therefore equipped with a dust-removing device 15 which, in the embodiment shown in FIG. 1, is arranged primarily inside the scale housing 2.

The dust-removing device 15 is equipped with a gas distributor 16 which is firmly attached to the underside of the housing wall 7 of the scale housing 2, and with a gas supply arrangement 17 which leads from the outside into the housing 2 and supplies the gas distributor 16 from below with gas, in particular with compressed air. The pressure of the gas, more specifically of the compressed air, can be regulated by means of the valve 18. The gas distributor 16 has a recess along its internal circumference, forming a flow channel 19. The gas or compressed air enters the flow channel 19 through a gas inlet 20. Through a narrow gap 21 formed between the peripheral wall 22 of the opening 8 on one side and the housing wall 7 on the other side, the compressed air passes from the flow channel 19 directly into a gas outlet 23 in the form of a gap extending parallel to the housing wall 7, through which the compressed air in the flow channel 19 is blown outwards in a horizontal direction, passing underneath the cap 5. Thus, any dust that settles on the housing wall 7 is blown away, preventing the formation of a dust bridge between the cap 5 and the scale housing 2. At the same time, the peripheral wall 22 prevents the outflowing stream of compressed air from interfering with the vertical movement of the force transfer device 6 and thereby affecting the weighing process.

This embodiment of the dust-removing device 15 is distinguished in particular by the excellent way in which it is integrated in the scale housing 2.

The supply of gas or compressed air occurs under manual or automatic control by means of a valve 18, through a pressure conduit 34. The valve 18 is equipped with a manually operated or automatic device 35 whereby gas can be introduced through the pressure conduit 34 into the flow channel 19 under a predetermined amount of pressure.

Figure 2:
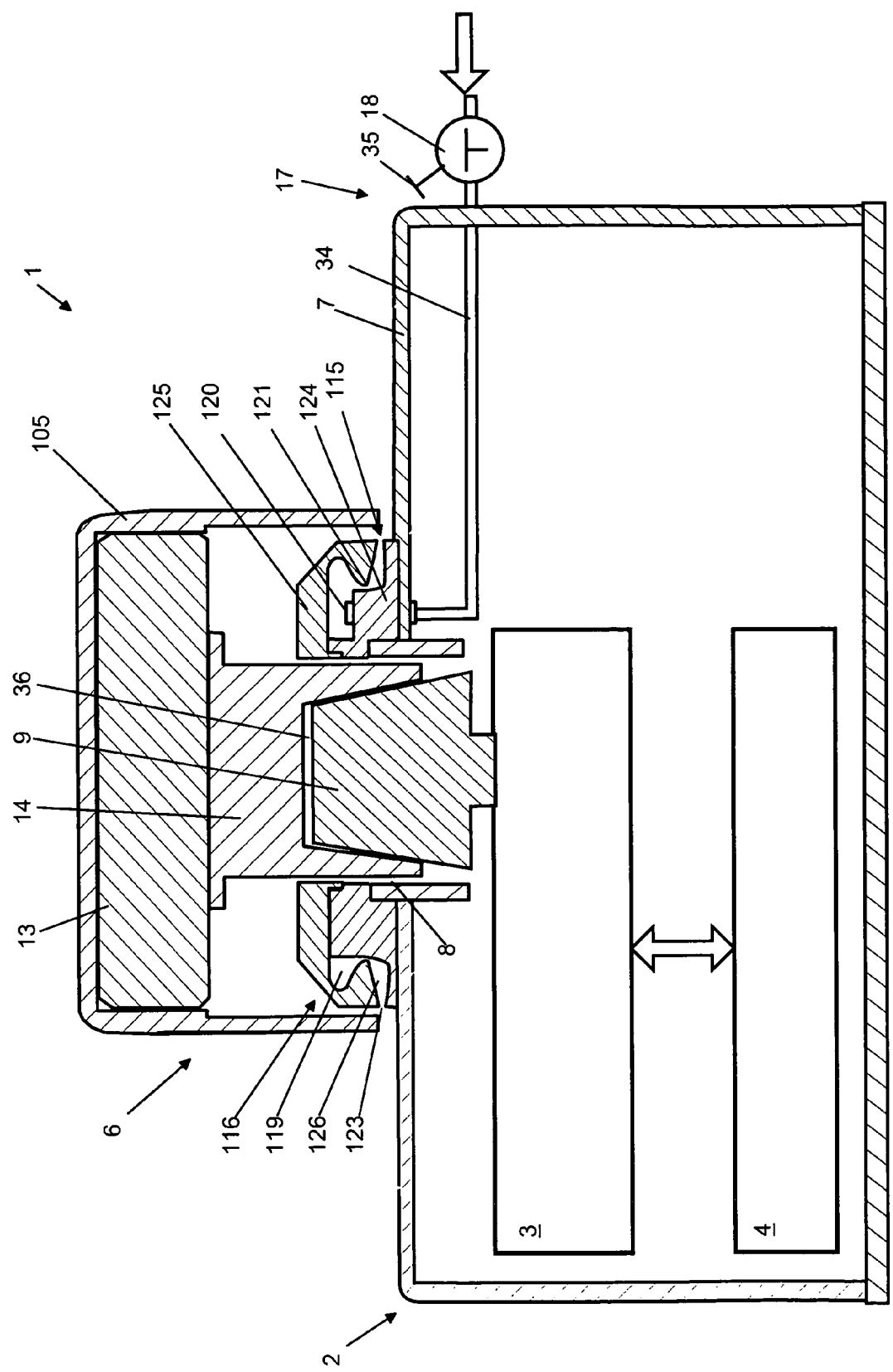
FIG. 2 represents a lengthwise sectional view of a weighing module with another device according to the invention for removing dust, which device is designed to be placed on top of the housing.

FIG. 2 illustrates a weighing module with another embodiment of a dust-removing device 115 according to the invention. Parts which are unchanged in their design in comparison to FIG. 1 are identified by the same reference symbols. This dust-removing device 115 can be installed from above on the topside 7 of the scale housing 2 and is thus of a modular nature, since the gas distributor 116 can be retrofitted to the weighing scale and can also be removed again at any time. The gas distributor 116 is configured in two parts comprising a distributor ring 124 and a cover part 125. The latter has a special recessed compartment forming a part of a first flow channel 119. When the cover part 125 is installed on the distributor ring 124, the recessed compartment is located exactly above the gas inlet 120 and has the function of introducing the gas or the compressed air into the circular first flow channel 119. A narrow gap passage 121 leads from the first flow channel 119 to a second flow channel 126 which, in turn, leads to the gas outlet 123 which is again configured as a gap extending along the entire circumference of the gas distributor 116. The embodiment shown in FIG. 2 further includes a simplified version of a cap 105.

In addition to the improvements in regard to its installation, a gas distributor 116 according to the foregoing description also has the advantage of being convenient to disassemble for cleaning.

In FIG. 3, a third embodiment of a gas distributor 216 is shown in a three-dimensional representation. It comprises again a distributor ring 224 and a cover part 225. Like the embodiment described in the context of FIG. 2, it has two flow channels preferably arranged one above the other (only one of the channels is visible in FIG. 3).

As is evident from FIG. 4, which provides a sectional view of the distributor ring 224 along the line A—A of FIG. 5 and of the cover part 225 along the line B—B of FIG. 5, the first flow channel 219 is composed of circular grooves that are recessed, respectively, in the distributor ring and the cover part. In the assembled condition, the grooves together form the first flow channel which is connected to the second flow channel 226 through a plurality of preferably round gas passage openings 227 (see also FIG. 5) through which the gas or compressed air flows from the first into the second flow channel. The compressed air leaves the second flow channel 226 again through a gas outlet in the form of a circular gap which exists between the housing wall 7 and the distributor ring 224 when the gas distributor 216 is in its installed position on the topside of the housing wall 7. The gap is dimensioned with a width of 0.1 to 0.5 mm in order to maintain an adequate amount of pressure behind the outflowing air.

FIG. 5 shows the cover part 225 as well as the distributor ring 224 of the gas distributor in a top view. The gas passage openings 227 which connect the first flow channel 219 to the second flow channel 226 (see FIG. 4) are clearly visible in FIG. 5. The cover part 225 is fastened to the distributor ring 224 by means of screws which are inserted through the passage holes 228 into the tapped holes 229 of the cover part 225. The passage holes 230 in the cover part 225 and the passage holes 231 in the distributor ring 224 serve to fasten the gas distributor 216 to the top of the housing wall 7. The opening 232 in the distributor ring 224 is a part of the gas inlet, leading into a recessed compartment 233 of the cover part 225 when the latter is in its installed position. From the recessed compartment 233, the compressed air reaches the first flow channel 219.

The second flow channel 226 (see FIG. 4) is connected to the at least one housing wall 7 in such a way that a narrow gap is left through which the air streams outward, primarily in a radial direction. Alternatively, jet nozzles with an outward radial orientation can be arranged at the second flow channel to perform the function of the gas outlet.

It is furthermore irrelevant whether the gas outlet is formed directly between the housing wall and the distributor ring, or whether it is arranged between the distributor ring and the cover part as shown, e.g., in FIG. 2, or whether the distributor ring is seated on a base plate which, in turn, is attached to the housing wall.

Conceivable embodiments of a gas distributor that lie within the scope of the present invention include designs in the form of a single part or of several parts, in particular two-part designs, wherein the gas distributor can have either one flow channel or two flow channels that are connected to each other.

As is self-evident, a dust-removing device according to the invention is not absolutely required to be arranged at the topside housing wall. Rather, it will in each case be arranged at the passage opening for the force transfer member of the scale, for example at the bottom of the scale housing in the case of a suspended load arrangement or at the side for a lateral passage of the force transfer member through the scale housing wall.

What is claimed is:

1. A weighing module with a housing surrounding a weighing cell having a vertically movable force transfer member adapted for connection to a load-receiving device, the force transfer member having a cap positioned outside the housing and a portion extending through a passage opening of a housing wall and being rigidly connected to a vertically movable part of the weighing cell, the weighing module comprising:
   a skirt ring extending from the cap toward the housing, the housing and an edge of the skirt ring defining a gap between the cap and the housing; and
   a dust-removing device comprising a means for generating, during operation of the weighing module, an outwardly-directed gas flow through the gap to prevent dust accumulation in the passage opening.

2. The weighing module of claim 1, wherein:
   the gas flow generating means comprises a gas distributor.

3. The weighing module of claim 2, wherein:
   the gas distributor comprises a distributor ring and a cover adapted for connection to the distributor ring.

4. The weighing module of claim 3, wherein:
   the gas distributor has at least one ring-shaped flow channel for a gas under above-atmospheric pressure.

5. The weighing module of claim 2, wherein:
   the gas distributor has at least one ring-shaped flow channel for a gas under above-atmospheric pressure.

6. The weighing module of claim 4, wherein:
   the gas distributor has a first and a second flow channel, connected to each other, the first flow channel being connected to a gas inlet, and the second flow channel having a gas outlet.

7. The weighing module of claim 2, wherein:
   the gas distributor has a first and a second flow channel, connected to each other, the first flow channel being connected to a gas inlet, and the second flow channel having a gas outlet.

8. The weighing module of claim 1, wherein:
   the gas flow generating means comprises a gas outlet having jet nozzles.

9. The weighing module of claim 1, wherein:
   the gas flow generating means comprises a gas outlet configured as a narrow gap surrounding the dust-removing device.

10. The weighing module of claim 2, wherein:
    the gas distributor is arranged substantially inside the housing.

11. The weighing module of claim 6, wherein:
    the gas distributor is arranged substantially inside the housing.

12. The weighing module of claim 2, wherein:
    the gas distributor is set on the housing from the outside.

13. The weighing module of claim 6, wherein:
    the gas distributor is set on the housing from the outside.

14. The weighing module of claim 1, wherein:
    the gas flow generating means is designed to produce a continuous stream of gas.

15. The weighing module of claim 6, wherein:
    the gas flow generating means is designed to produce a continuous stream of gas.

16. The weighing module of claim 1, wherein: the gas flow generating means is designed to produce a pulsed stream of gas.

17. The weighing module of claim 6, wherein:
    the gas flow generating means is designed to produce a pulsed stream of gas.

18. A method for preventing dust from accumulating between a stationary housing and a vertically movable force transfer member of a weighing module by means of the dust-removing device of claim 1, wherein:

a gas stream takes place through the gap in the direction away from the movable part of the weighing module whether the weighing process is occurring or not.

19. The method of claim 18, wherein:
the gas stream is continuous.

20. The method of claim 18, wherein:
the gas stream is pulsed.

* * * * *